United States Patent
Heshmati

(10) Patent No.: US 7,510,165 B2
(45) Date of Patent: Mar. 31, 2009

(54) HVAC DOOR DECELERATOR SYSTEM WITH REDUCED NOISE

(75) Inventor: F. Michael Heshmati, Commerce Township, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 322 days.

(21) Appl. No.: 11/108,227

(22) Filed: Apr. 15, 2005

(65) Prior Publication Data
US 2006/0145108 A1 Jul. 6, 2006

Related U.S. Application Data

(60) Provisional application No. 60/641,575, filed on Jan. 5, 2005.

(51) Int. Cl.
*F16K 31/00* (2006.01)
(52) U.S. Cl. .......................... 251/64; 454/126
(58) Field of Classification Search ............. 251/64; 454/121, 126, 156
See application file for complete search history.

(56) References Cited

U.S. PATENT DOCUMENTS

| | | | | |
|---|---|---|---|---|
| 4,351,353 A | * | 9/1982 | Filidoro et al. | 251/282 |
| 4,534,275 A | * | 8/1985 | Hofmann | 251/251 |
| 4,605,198 A | * | 8/1986 | Greiner | 251/58 |
| 4,633,900 A | * | 1/1987 | Suzuki | 251/263 |
| 4,828,018 A | * | 5/1989 | Hoffman | 454/127 |
| 5,009,392 A | * | 4/1991 | Ostrand | 251/182 |
| 5,080,140 A | * | 1/1992 | Ostrand et al. | 251/163 |
| 5,228,475 A | * | 7/1993 | Trill | 251/279 |
| 5,687,790 A | * | 11/1997 | Trame et al. | 165/43 |
| 5,720,657 A | | 2/1998 | Kamiya et al. | |
| 6,032,723 A | * | 3/2000 | Tsuihiji et al. | 454/121 |
| 6,092,592 A | * | 7/2000 | Toyoshima et al. | 454/126 |
| 6,171,183 B1 | * | 1/2001 | Villbrandt et al. | 251/64 |
| 6,237,630 B1 | | 5/2001 | Stone et al. | |
| 6,347,988 B1 | * | 2/2002 | Kurokawa et al. | 454/121 |
| 6,354,934 B1 | | 3/2002 | Seuge | |
| 6,416,404 B2 | * | 7/2002 | Ozeki | 454/156 |
| 6,427,771 B1 | * | 8/2002 | Kako et al. | 454/121 |
| 6,443,335 B1 | | 9/2002 | Pinedjian et al. | |
| 6,450,877 B2 | * | 9/2002 | Tsurushima et al. | 454/156 |
| 6,564,819 B2 | * | 5/2003 | Zelczer | 251/62 |
| 6,579,167 B1 | * | 6/2003 | Demeniuk | 454/126 |
| 6,588,495 B2 | * | 7/2003 | Ito et al. | 454/126 |
| 6,607,433 B2 | | 8/2003 | Vincent | |
| 6,789,617 B1 | * | 9/2004 | Hashizume et al. | 251/250.5 |
| 6,793,573 B2 | | 9/2004 | Ueda | |
| 6,913,529 B2 | * | 7/2005 | Seki | 454/121 |
| 7,285,041 B2 | * | 10/2007 | Yoshida et al. | 454/126 |

FOREIGN PATENT DOCUMENTS

FR 2 803 054 6/2001

* cited by examiner

*Primary Examiner*—John Bastianelli
(74) *Attorney, Agent, or Firm*—Dierker & Associates, P.C.

(57) ABSTRACT

A door decelerator system reduces or prevents undesirable limits of audible door noise in an HVAC unit. The system includes a door, movable between end or stop positions; and a kinematics lever connected to the door at a common axis of rotation or the kinematics lever having a deceleration axis common with the door, the kinematics lever having a deflection area incorporated therein. A rigid rib is incorporated in a housing of the HVAC unit, the rigid rib disposed in compressive contact with the deflection area at least as the kinematics lever reaches an end of travel. The deflection area is physically separable from the rigid rib.

6 Claims, 3 Drawing Sheets

HVAC DOOR DECELERATOR SYSTEM WITH REDUCED NOISE

This application claims priority of U.S. provisional application Ser. No. 60/641,575, filed Jan. 5, 2005.

FIELD OF THE INVENTION

The present invention relates to HVAC units and noise problems associated with mechanical parts in HVAC units.

BACKGROUND OF THE INVENTION

Some HVAC units use actuators for doors. These doors, when closing, may cause a substantial about of noise or audible sounds that may be undesirable for the consumer in an air conditioned automotive unit. For example, current cable operated HVAC door technology does not incorporate a mechanism to reduce door acceleration to prevent door audible noise when the door contacts a sealing surface. Most HVAC unit designs today utilize electric actuated kinematics where door speed is managed at a constant speed with the actuator in order to mitigate door noise.

One solution to the foregoing noise problem includes overmolding foam on the door as a dampener to mitigate door slap noise. In fact, a number of HVAC door designs today are using over molded santoprene architecture. This design is more conducive because there is plastic to plastic contact (door and sealing surface). However, there is still a need to find a mechanism to mitigate or reduce the noise to less audible levels to comply with consumer desires.

In the prior art, for example, some doors turn or rotate around an axis, and need to be stopped at a certain point. These doors often include pieces provided with surfaces at end points thereof that are modified in order to stop further movement of the door. These piece also prevent the door from turning too far and hitting or slapping a wall or other feature. When the door hits or slaps the wall or other feature, it is accompanied with the element of noise.

Other features have been described that immobilize a body that turns or rotates around an axis, such as in FR 2 803 054 A1. These features stop the movement of the body before the body gets to an angular immobilization position. By putting a tab or finger on the rotating body itself, the tab or finger can be displaced in such a way that the finger does not contact a cam or other feature, or slow down the door's movement until the door reaches an extreme end of its trajectory.

Other solutions to the noise problem have been attempted to mitigate or reduce the noise of HVAC units, however, a constant deceleration method of the type disclosed herein below has not been described in the prior art.

SUMMARY OF THE INVENTION

The present invention addresses the need for a door decelerator system to mitigate door noise at the end of travel when the door closes.

The present invention relates to a door decelerator system that essentially eliminates the undesirable door slap noise in cable operated and, particularly, in some electric actuated systems (as described above). This is accomplished by reducing an acceleration/speed of the door prior to the door reaching the end of travel. The door decelerator system can improve the HVAC unit noise by eliminating door audible noise at the end of travel.

The door decelerator system preferably reduces the door acceleration and/or speed as it arrives at the end of its travel, i.e., against a sealing surface inside the HVAC housing that is normally found at the end of travel. At the end of travel, the door also should not suppress if the door is functioning properly. In the present invention, reducing the door speed/acceleration, particularly in a constant manner, prevents or greatly reduces audible noise as a result of door contact with the sealing surface inside the housing when the door is operating at a high rotational speed. A "constant manner," as referred to herein, is a manner where door deceleration occurs throughout most of or, preferably essentially all of the travel of the door from an initial position of the door to a final stopped position. The door is preferably constantly decelerated prior to the door reaching the end of its travel or contacting the sealing surface.

The present invention, in its preferred embodiments, reduces audible noise in a process comprising: initially contacting the decelerator lever flexible arm with a first compression rib or ribs; slowly deflecting the decelerator lever flexible arm against one or more of the compression ribs until it is fully compressed, thereby reducing rotational velocity of the decelerator lever and the door pivoting about a door axis; and fully deflecting the lever decelerator flexible arm as the door reaches an end of its travel. By following these steps, the door contacts with the sealing surface and noise is mitigated, thereby resulting in minimal audible noise.

In more preferred embodiments of the present invention, a so-called door decelerator input/output system is employed. The present invention, in more preferred embodiments, uses a kinematic system to activate the door inside the HVAC housing. In even more preferred embodiments, the door inside the HVAC housing is actuated via a kinematics system comprised of the following: a control head operated by the vehicle driver and/or passenger; an actuator/cable inputted from the control head; a cam inputted from actuator cable; a decelerator lever inputted from movement of the cam via the actuator/cable; an HVAC door inputted from the decelerator lever; and a door sealing surface at position at the end of travel of the door.

Also, friction of parts of the door decelerator occurs throughout most of, or preferably essentially all of the travel of the door from the initial position to the final stopped position. In more preferred embodiments of the present invention, the friction and/or accompanying deflection between a flexible arm of the decelerator lever and a compression rib occurs along an entire path of travel of the door as the door moves from the initial position to the final stopped position.

BRIEF DESCRIPTION OF THE DRAWINGS

The figures show views of HVAC units with a door decelerator, both flexible and inflexible, and a lever engaged and disengaged with at least one part of the door decelerator.

PREFERRED EMBODIMENT OF THE PRESENT INVENTION

Figure 1:
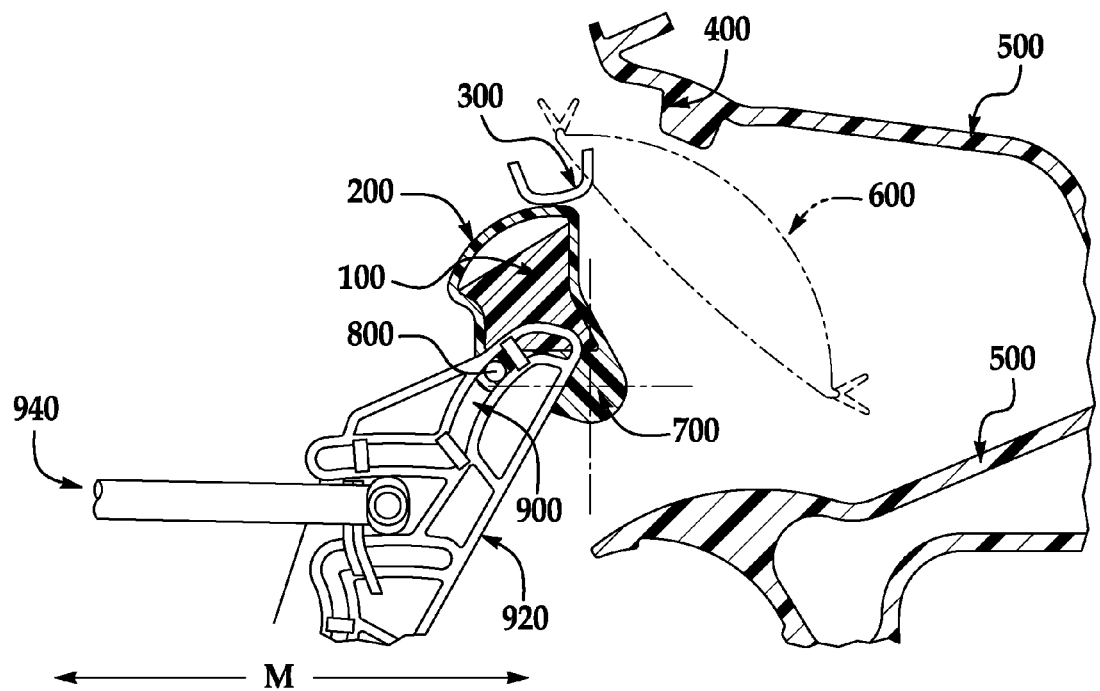
FIG. 1 illustrates a cross-sectional view of an HVAC unit, showing a door and a door decelerator consisting of a lever with an arm and a rib at the beginning of the door movement, where the lever and the rib contact, in accordance with an aspect of the present invention.

In preferred embodiments of the present invention, a door decelerator system is presented that reduces door acceleration/speed to prevent audible door noise in an HVAC system. In preferred embodiments of the present invention, the door decelerator comprises at least one first part and at least one second part. The at least one first part and the at least one second part may be incorporated in the kinematics lever or, preferably, separately if, for example, the HVAC architecture does not allow the decelerator to be incorporated in drive levers and systems where direct drive electric actuators without levers are used. In particularly preferred embodiments of the present invention, the door decelerator system consists of a door decelerator rib, wall, or projection, the lever, and other parts of the HVAC unit. The door decelerator rib, wall, or projection (rib) consists of a flexible or rigid rib or wall, more preferably, a rigid rib or other projection like a rib. The door decelerator rib, wall, or projection may be used as a door stop by decreasing a flexible mechanism of the decelerator system (flexible lever/flexible compression rib, more preferably semi-flexible or inflexible rib, even more preferably, largely inflexible rib).

In preferred embodiments of the present invention, a door decelerator system is provided that reduces or prevents undesirable limits of audible door noise in an HVAC unit. The door decelerator system having: a door; a kinematics lever; a door decelerator consisting of at least one first part and at least one second part; wherein the at the least one first part is physically separate from the at least one second part, and wherein the at least one first part is incorporated in, attached to, or part of the kinematics lever. Also provided is a connection or door lever deceleration axis common between the lever and the door. In preferred embodiments, the at least one first part is physically separate from the at least one second part, and wherein the at least one second part is incorporated in, attached to, or part of the housing of the HVAC unit.

In more preferred embodiments of the present invention, the door decelerator uses a flexible arm, together with a compression rib, to reduce the door lever acceleration. This provides a slowdown of the door so that undesirable audible noise at the end of the door's path is reduced or eliminated. In preferred embodiments of the present invention, the flexible part of the lever contacts the compression rib, and the lever is slowly compressed so that friction between the two is provided as the door reaches the end of travel. Though the lever can be flexible or non-flexible, it is preferably flexible. In preferred embodiments of the present, through use of this system, door speed can be reduced and less effort is used prior to the end of the travel of the door, thereby preventing an undesirable audible door slap noise. This is accomplished without the need of an additional cut-out or other feature either on the door or on the cam. The compression rib is preferably found on the interior surface of the HVAC housing and provides for a constant, progressive deceleration of the door prior to the door reaching the end of its specified trajectory. The parts of the door decelerator, in preferred embodiments, are incorporated together with the door actuation lever. In cases where the door is directly driven by an actuator (i.e., electrically), at least one part is separate from a direct actuation lever. By using such a door decelerator system in the HVAC unit, the door decelerator can act as a soft door stop to prevent the door from over traveling or achieving an inappropriate final location.

In more preferred embodiments, the at least one second part of the door decelerator is a semi flexible or rigid wall or rib. Also more preferred is a door decelerator system wherein the kinematics lever has a branch or arm, and even more preferred where the branch or arm of the kinematics lever is semi-flexible or flexible.

In even more preferred embodiments of the present invention, the deceleration of the door work by a method of actuation and deflection of a flexible door lever against a compression rib. Deceleration is based on actuation and deflection of a flexible door lever against a compression rib. The deflection is preferably manual, non-manual, or electronic, As the flexible door lever is actuated from one extreme (the initial position) to another (the final stopping position) (i.e., is fully open/fully closed), the lever will deflect against the rigid, semi-rigid, or flexible compression rib, preferably a rigid or semi-rigid compression rib, prior to the door reaching its normal end of travel. The lever continues to deflect until the door's intended end of travel position is reached.

The door decelerator system can, preferably, also have an electric lever actuator.

In the even more preferred embodiments, deflection of the flexible door lever acts as a soft or constant brake or deceleration of the door. This allows the door to reduce its acceleration and speed prior to reaching the final sealing, end or stopping position to prevent the undesirable audible door slap noise.

Also provided in the present invention are methods for reducing audible noise in t HVAC unit having doors driven by a system with levers and used for directing, deflecting, or blending air. The HVAC unit also includes a decelerator system. The audible noise is reduced by: contacting a decelerator lever flexible arm initially with a compression rib or ribs; deflecting the decelerator lever flexible arm constantly against one or more of the compression ribs until it is fully compressed; reducing a rotational velocity of the decelerator lever and the door pivoting about a door axis while the ribs are being compressed; and deflecting the lever decelerator flexible arm fully as the door reaches the end or stop position of its travel. In more preferred embodiments of the present invention, constant friction across a surface of contact between the compressor rib and the lever reduces the velocity of the decelerator lever from immediately after the start of door pivoting movement until the end or stop position of the door's travel. Also preferred is a door input/output decelerator system having a kinematics system including an HVAC door, where the kinematics system activates the HVAC door inside an automotive HVAC housing. The door input/output decelerator system comprises: a control head, operated by a vehicle driver and/or passenger; an actuator or cable inputted from the control head; a cam inputted from the actuator or cable; a decelerator lever inputted from movement of the cam via the actuator or cable; an HVAC door inputted from a decelerator lever that works together with the door; a compression rib providing friction with the decelerator lever; and a door sealing surface at the end of travel position of the door; wherein the door input/output system decelerates the speed or the velocity of the door from an open position to a closed position, or from a closed position to an open position of the door in a constant manner after the door's starting point until the door's final end point with a minimal amount of audible noise occurring when the door reaches the final end point.

Figure 2:
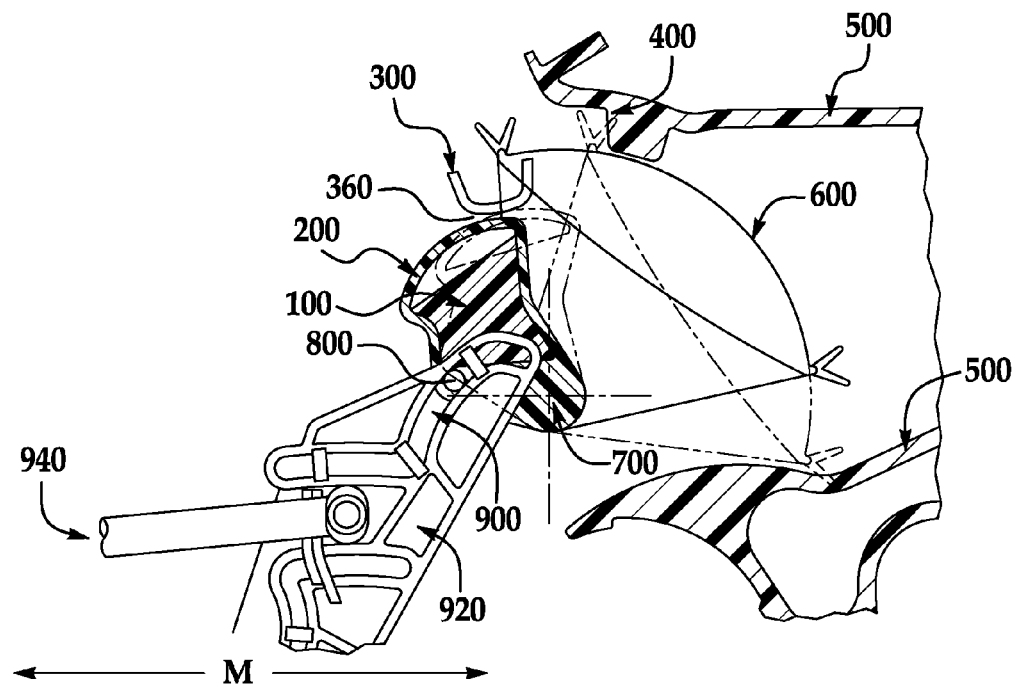
FIG. 2 shows a cross-sectional view of a door decelerator with a deformable or flexible lever during a deceleration process, in accordance with an aspect of the present invention.
Figure 3:
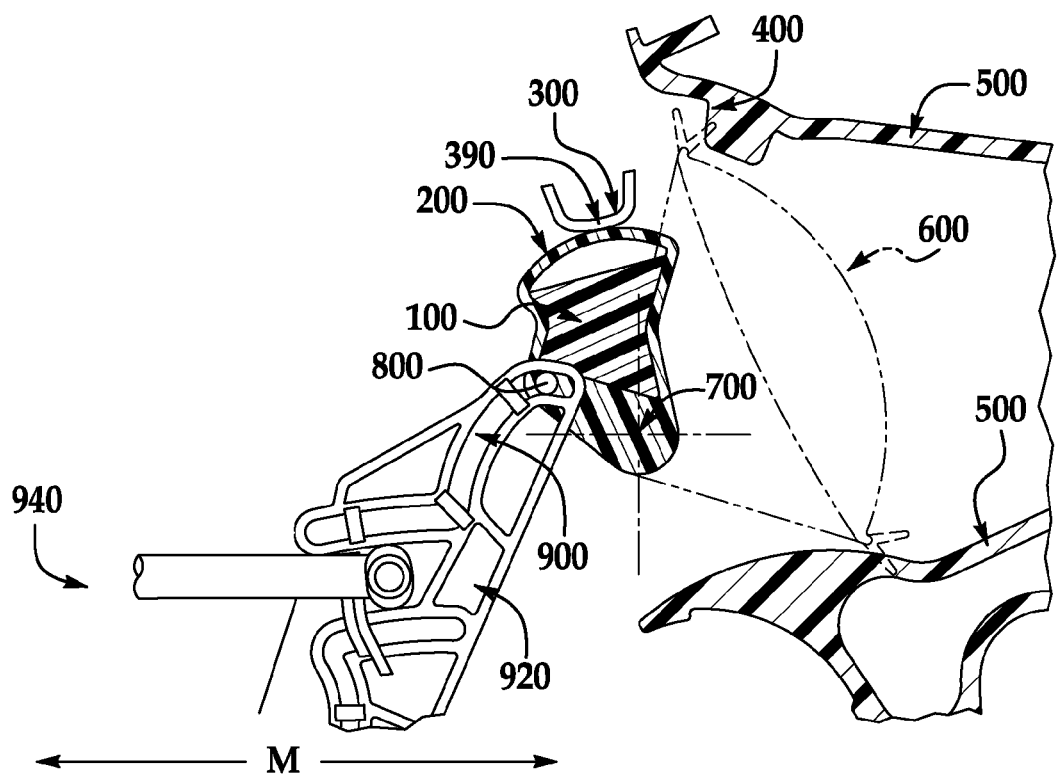
FIG. 3 shows a door decelerator with a deformable or flexible lever at full deflection, in accordance with an aspect of the present invention.

FIG. 1 shows the door decelerator comprising the lever and the rib in an HVAC unit during initial contact of the lever with rib. FIG. 2 shows the door decelerator comprising the lever and the rib in the HVAC unit during a deceleration process after initial contact. FIG. 3 shows the door decelerator comprising the lever and the rib in the HVAC unit at full deflection (end or final stop position in the door moving process). M illustrates movement of the cam with movement from a mode cable.

Illustrated in FIGS. 1-3 is a door decelerator system used to reduce door (600) acceleration/speed as the door moves from the open to the closed position via, for example, a control head input to the cable (940), to the cam (920), to the decelerator lever (100), and finally to the door (600).

Door speed/acceleration prior to the door (600) contacting the door sealing surface (400) inside the HVAC housing (500) at a high rotational input from a vehicle control head (not shown) to the mode cable (940) is illustrated.

Deflection/friction between a decelerator lever flexible arm (100) against the compression rib (300) occurs, with initial contact of decelerator lever flexible arm (100) with the compression rib (300) to impede, at same level, door rotation as the decelerator lever makes contact with the compression rib (300).

Decelerator lever flexible arm (100) slows down the rotational velocity of the door as the door slowly deflects against the compression rib (300) until the door reaches the sealing surface (400).

Door (600) velocity will be at a minimum as it makes contact with the door sealing surface (400) and the decelerator lever flexible arm (100) will be at a maximum deflection.

Referring to FIG. 1, the compression rib (300) and the decelerator lever arm (200), which is preferably flexible, have initial contact at (330) as the door (600) approaches the sealing surface (400). Decelerator lever (100) is shown with drive pin (800). Preferably, a drive pin (800) receives input from the cam (920), where the lever and the door have a pivot point (700). The cam slides in a cam track (900). Cam (920) movement can be driven with input from the mode cable (940). The mode cable (940) can have input from the vehicle control head (not shown). The door sealing surface (400) is shown on housing (500) with door (600) shown in open position.

Referring to FIG. 2, the compression rib (300) and the decelerator lever arm (200), which is preferably flexible, are shown with the lever flexible arm contacting the rib from initial contact to the final stopping position of the door at a region around area (360). The door (600) approaches and eventually reaches the sealing surface (400).

In FIG. 2, the decelerator lever (100) is shown with the drive pin (800). Preferably, the drive pin (800) receives input from the cam (920), and the lever and the door have the pivot point (700). The cam slides in the cam track (900). Cam (920) movement can be driven with input from the mode cable (940). The mode cable (940) can have input from vehicle control head (not shown).

Also in FIG. 2, the door sealing surface (400) is shown on the housing (500) with door (600) shown in a closed position.

Referring to FIG. 3, the compression rib (300) and the decelerator lever arm (200), which is preferably flexible, are shown with the decelerator lever arm at full deflection in area (390) with the compression rib (300) when the door (600) reaches the sealing surface (400).

In FIG. 3, the decelerator lever (100) is shown with the drive pin (800). Preferably, the drive pin (800) receives input from the cam (920), and the lever and the door have the pivot point (700). The cam slides in the cam track (900). Cam (920) movement can be driven with input from the mode cable (940). The mode cable (940) can have input from the vehicle control head (not shown).

Also in FIG. 3, the door sealing surface (400) is shown on the housing (500) with door (600) shown in a closed position.

Figure 4:
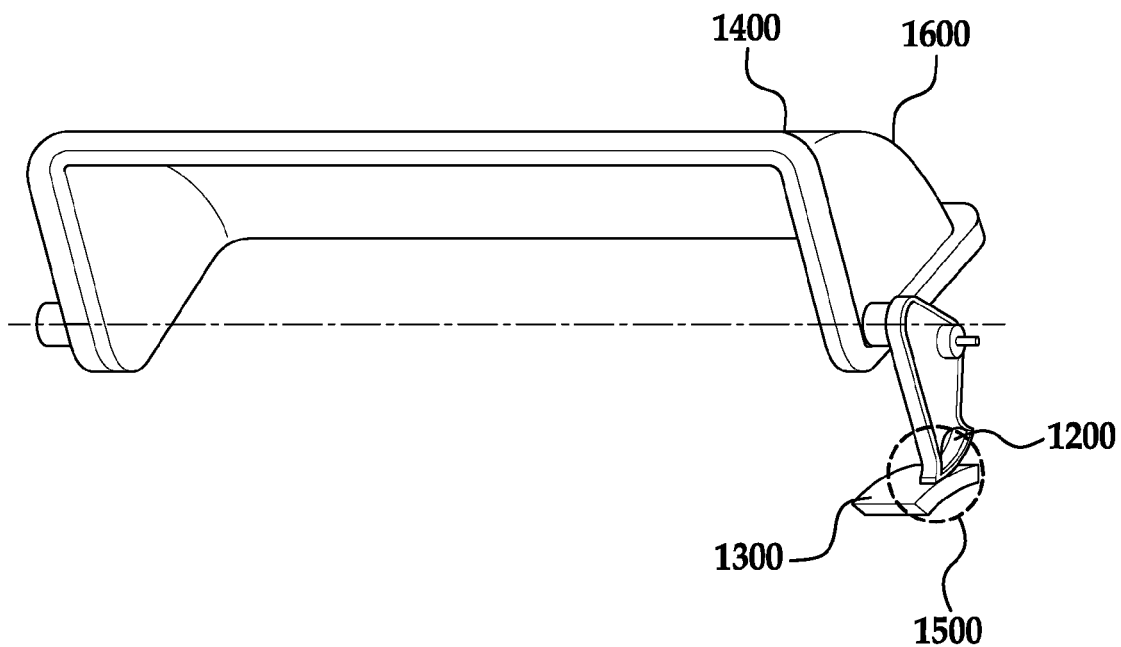
FIG. 4 shows a door decelerator with a deformable or flexible lever, a rib, and an HVAC door, in accordance with an aspect of the present invention.

FIG. 4 illustrates an HVAC door (1600) with a door decelerator area (1500) shown. A rib (1300) is in contact with a lever (1200) and a sealing surface (1400) is shown on the door.

Figure 5:
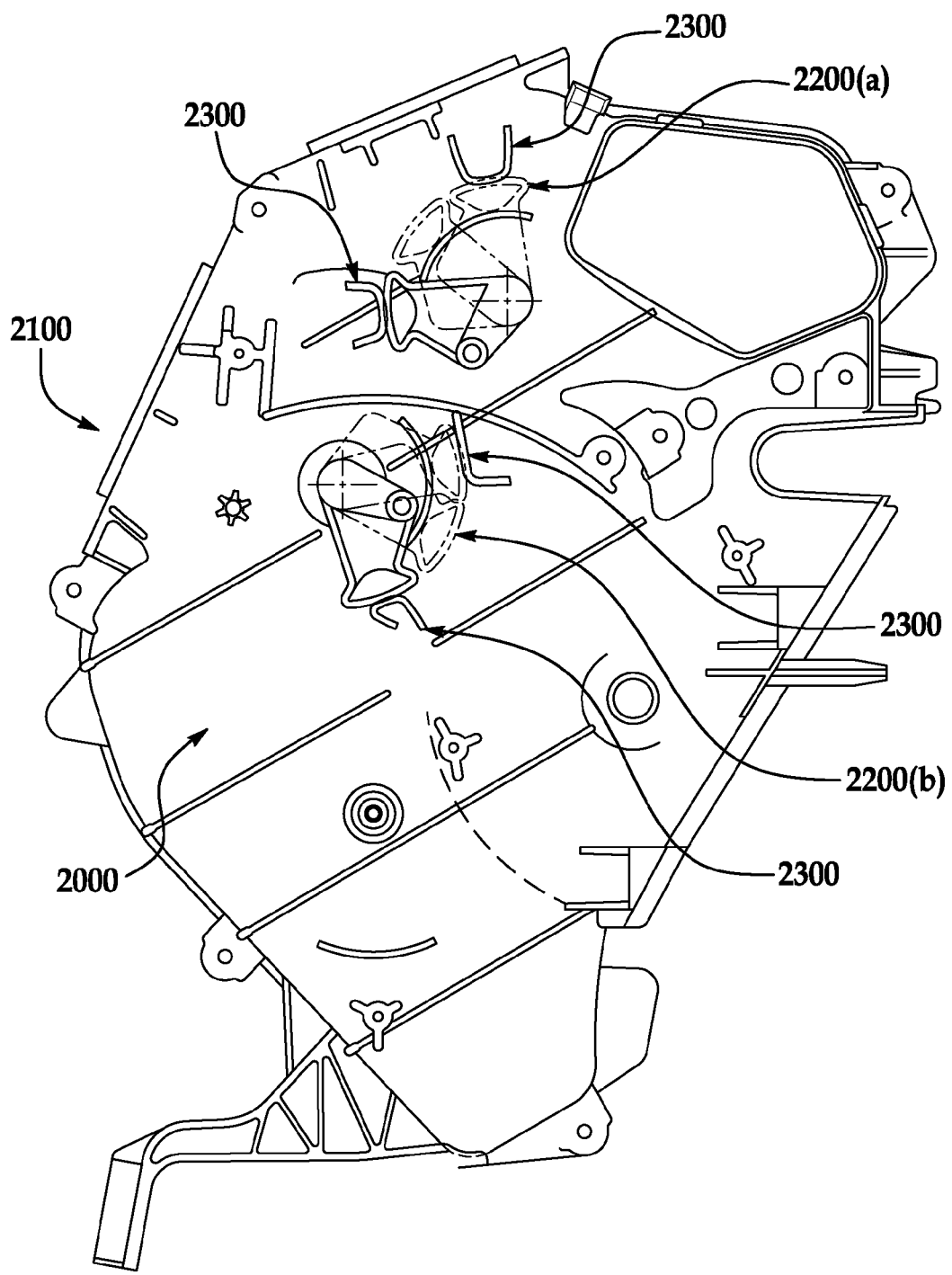
FIG. 5 shows a cross-sectional view showing how the door deflector, consisting of a rib and a lever, respond in response to actuator/cable signals that move the door.

FIG. 5 is a cross sectional schematic view of a preferred embodiment of the present invention employing more than one first and/or second parts of the door decelerator. An HVAC unit (2700) is shown having two lever arms (2200(*a*)) and (2200(*b*)) in various positions, where placement of the compression ribs (2300) depends on closing needs of the door. A distribution area (2000) is also shown.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The invention claimed is:

1. A door decelerator system to reduce or prevent undesirable limits of audible door noise in an HVAC unit, comprising:
   a door, movable between end or stop positions;
   a kinematics lever, having a deflection area incorporated therein, and:
      connected to the door at a common axis of rotation; or having a deceleration axis of rotation common with the door; and
   a rigid rib incorporated in a housing of the HVAC unit, the rigid rib disposed in compressive contact with the deflection area at least as the kinematics lever reaches an end of travel;
   wherein the deflection area is physically separable from the rigid rib.

2. The door decelerator system as in claim 1, wherein the system is used as a door stop mechanism.

3. The door decelerator system as in claim 1, wherein the deflection area is a branch or arm.

4. The door decelerator system as in claim 3, wherein the branch or arm is semi-flexible or flexible.

5. The door decelerator system as in claim 4, wherein there is more than one rigid rib.

6. The door decelerator system as in claim 1, further comprising an electric lever actuator.

* * * * *